(12) United States Patent
Ulrich

(10) Patent No.: US 6,471,255 B1
(45) Date of Patent: Oct. 29, 2002

(54) ANTI-ROTATION ARRANGEMENT FOR A DETECTION DEVICE ASSEMBLY

(76) Inventor: Richard L. Ulrich, 12161 Parkwood Pl., St. Louis, MO (US) 63043

( * ) Notice: Subject to any disclaimer, the term of this patent is extended or adjusted under 35 U.S.C. 154(b) by 0 days.

(21) Appl. No.: 09/524,322

(22) Filed: Mar. 13, 2000

(51) Int. Cl.$^7$ ................................................ F16L 19/00
(52) U.S. Cl. ........................................ 285/354; 285/328
(58) Field of Search ................................ 285/354, 319, 285/314, 328

(56) References Cited

U.S. PATENT DOCUMENTS

| | | | | |
|---|---|---|---|---|
| 579,643 A | * | 3/1897 | Gleason | 285/354 X |
| 769,654 A | * | 9/1904 | Kemper | 285/354 |
| 1,906,826 A | * | 5/1933 | Smith et al. | 285/328 X |
| 3,064,998 A | * | 11/1962 | Syverson | 285/354 X |
| 4,316,624 A | * | 2/1982 | Davlin | 285/354 X |
| 4,586,735 A | * | 5/1986 | Innes | 285/354 |
| 5,143,286 A | * | 9/1992 | Hansen et al. | 285/314 |

FOREIGN PATENT DOCUMENTS

DE    3812211    *  2/1989  ............. 285/354 X

* cited by examiner

Primary Examiner—Eric K. Nicholson
Assistant Examiner—David E. Bochna
(74) Attorney, Agent, or Firm—Greensfelder, Hemker & Gale, P.C.

(57) ABSTRACT

An anti-rotation arrangement for a detection device assembly used in a fire suppression system. The anti-rotation arrangement comprises an adapter secured to the housing of the detection device, a locking collar freely rotatable between the adapter and housing, and a union engageable to the locking collar and a T-fitting of a fluid conduit for connecting the detection device assembly to the T-fitting. Both the union adapter and union include radial teeth formed about the outer circumference of each component which interlock and mate when the union is securely, fully engaged to the locking collar during connection of the detection device assembly to the fluid conduit. The interaction of the radial teeth effectively prevents rotation of the detection device assembly once the assembly is engaged to the T-fitting of the fluid conduit.

13 Claims, 6 Drawing Sheets

ANTI-ROTATION ARRANGEMENT FOR A DETECTION DEVICE ASSEMBLY

BACKGROUND OF THE INVENTION

1. Field of the Invention

The present invention relates to a detection device assembly attached to a T-fitting of a conduit pipe, and more particularly to an anti-rotation arrangement for a detection device assembly that prevents rotation of the detection device relative to the T-fitting after attachment thereto. More specifically, the present invention relates to an anti-rotation arrangement that permits installation and removal of the detection device assembly without having to rotate the entire assembly.

2. Prior Art

Fire suppression systems are well known in the art and are used in residential and commercial buildings for detecting, suppressing and extinguishing fires through a system of sprinklers, fluid conduits and detection systems installed throughout the building. Normally, fire suppression systems comprise a system of sprinklers in communication with fluid conduits which are connected to a municipal water supply for supplying water to the sprinklers in order to extinguish fires inside the building. Fire suppression systems normally include detection devices for detecting changes in pressure and fluid flow within the fluid conduits when the sprinklers are activated during a fire in order to activate an alarm. In the prior art, detection devices were installed along the fluid conduits at T-fittings by engaging an integral union of the detection device to the T-fitting and rotating the entire device until it was fully engaged to the T-fitting in a fluid tight seal.

However, these type of detection devices had several drawbacks. Prior art detection devices, such as those which detect fluid flow, must have the device housing oriented correctly relative to the direction of fluid flow through the fluid conduit in order to accurately detect such flow. If the device housing is bumped or jarred during maintenance of the fire suppression system, the detection device could be inadvertently rotated and placed in the wrong orientation, thereby rendering it ineffective. Further, in residential fire suppression systems such detection devices are normally located inside a small space located between the walls of the residence which makes rotation and removal of the entire device for maintenance purposes impossible without first tearing out a section of the wall in order to properly access the device.

Accordingly, there is a need in the art for detection device assembly having an anti-rotation arrangement that prevents inadvertent rotation of the device housing relative to the T-fitting of a fluid conduit after installation of the device. In addition, there is a need in the art for an anti-rotation arrangement that permits installation and removal of the detection device within small spaces without having to rotate the entire device housing.

OBJECTS AND SUMMARY OF THE INVENTION

In brief summary, the present invention overcomes and substantially alleviates the deficiencies in the prior art by providing an anti-rotation arrangement for a detection device assembly for use in a fire suppression system. The anti-rotation arrangement of the present invention comprises a union, an adapter and a locking collar. The adapter includes a body having upper and lower portions and a passage formed therethrough for communication with the fluid pathway of the fluid conduit. In addition, the face of the lower portion of the adapter has radial teeth formed adjacent the outer circumference of the adapter, while the upper portion thereof is adapted for attachment to a housing of the detection device assembly. The locking collar is provided as a means for installing and removing the detection device assembly to the T-fitting without having to rotate the entire assembly. Specifically, the locking collar has an annular shape having distal and proximal openings with a passage formed between the openings. The interior surface of the passage includes internal threads which terminate at an inner shoulder formed adjacent the proximal opening. During assembly, the adapter is seated against the shoulder of the locking collar and secured to the housing of the detection device assembly such that the locking collar is freely rotatable between the housing and the adapter. Preferably, a union having top and bottom threaded portions and a shoulder formed therebetween is provided for attaching the detection device assembly to a T-fitting of a fluid conduit. The face of the top threaded portion of the union includes radial teeth formed adjacent the outer circumference of the face which are adapted to mate with the radial teeth of the adapter when the locking collar is secured to the union during engagement of the detection device assembly to the T-fitting.

To assemble, the adapter is inserted through the distal opening of the locking collar until the adapter abuts against the internal shoulder of the locking collar. The lower portion of the adapter is then secured to the underside of the device housing such that the locking collar freely rotates between the adapter and the device housing, but is securely engaged therebetween. Once the adapter is secured to the device housing, the bottom threaded portion of the union is engaged to the T-fitting by rotating the bottom threaded portion into secure engagement with internal threads formed adjacent the opening of the T-fitting. The user then engages the internal threads of the locking collar with the external threads of the upper threaded portion of the union by rotating the locking collar in one direction until the radial teeth of the adapter mate with the radial teeth of the union and a secure engagement is achieved between the locking collar and the union without rotation of the device housing. Once the detection device assembly is secured to the T-fitting, the mating of the radial teeth of the union and adapter effectively prevents rotation of the device housing relative to the T-fitting after installation.

In an alternative embodiment, the bottom portion of the union has a generally smooth cylindrical configuration rather than having the external threads found on the preferred embodiment so that T-fittings which do not have internal threads may be engaged by the union. An adhesive or other suitable bonding material is applied to the lower portion of the union for providing a sealing engagement when the union is inserted inside the T-fitting.

Accordingly, the primary object of the present invention is to provide an anti-rotation arrangement for a detection device assembly that prevents rotation of the device housing after installation.

Another object of the present invention is to provide an anti-rotation arrangement that permits installation and removal of the detection device assembly in relatively small spaces without having to rotate the device housing.

A further object of the present invention is to provide an anti-rotation arrangement that may be attached to T-fittings of fluid conduits that do not have internal threads.

Another further object of the present invention is to provide a simple and cost-effective method of installing and removing a detection device assembly to different types of T-fittings.

These and other objects of the present invention are realized in the preferred embodiment of the present invention, described by way of example and not by way of limitation, which provides for an anti-rotation arrangement for preventing rotation of the detection device assembly relative to a T-fitting of a fluid conduit.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
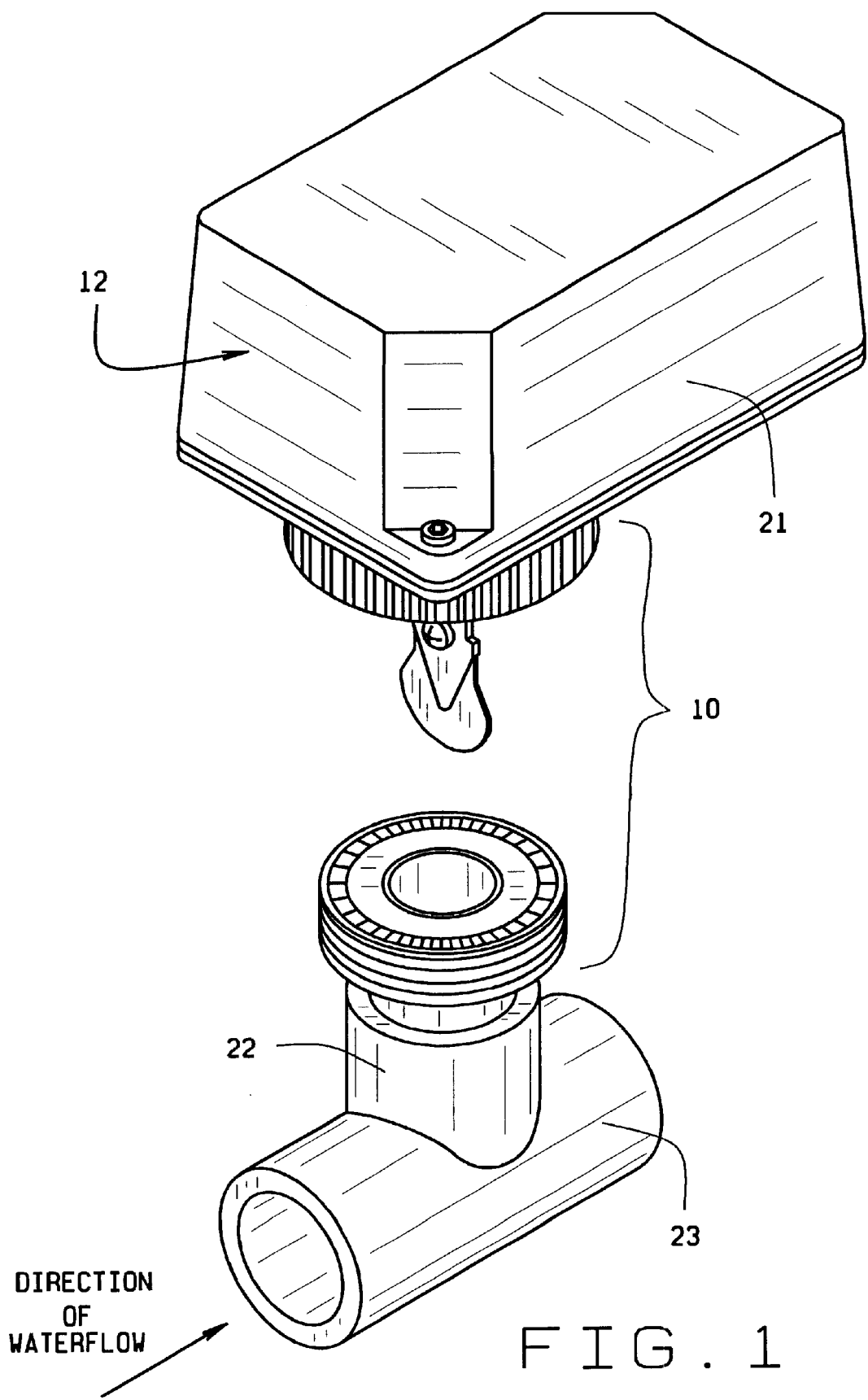
FIG. 1 is an elevated perspective view of a detection device assembly being connected to a T-fitting according to the present invention.

Referring to the drawings, the preferred embodiment of the anti-rotation arrangement of the present invention is illustrated and generally indicated as 10 in FIG. 1. Anti-rotation arrangement 10 is adapted for use with a detection device 12 having a housing 21 which is coupled to a T-fitting 22 of a fluid conduit 23. Preferably, detection device 12 is a conventional fluid flow detector, such as the detector manufactured by Potter Electric Signal Company of St. Louis, Mo., for detecting fluid flow within a fluid conduit. However, the present invention contemplates that a variety of other detection devices 12, such as a pressure detector, could be used with the anti-rotation arrangement 10.

Figure 2:
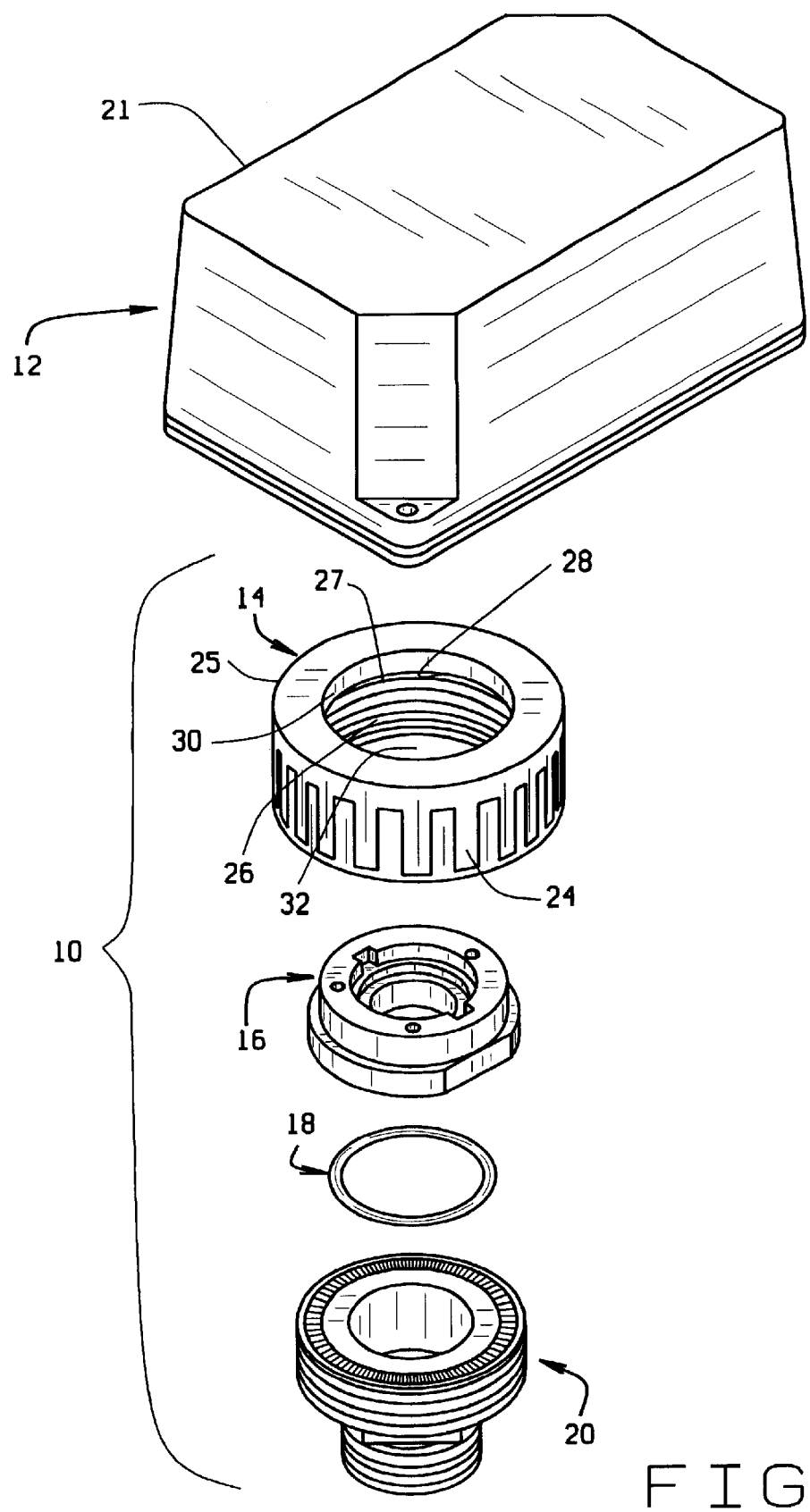
FIG. 2 is an exploded perspective view of an anti-rotation arrangement according to the present invention.

Referring to FIG. 2, anti-rotation arrangement 10 comprises a locking collar 14, union adapter 16 and union 20.

Locking collar 14 provides a means for securing detection device 12 to T-fitting 22 without having to rotate the housing 21 of,device 12. Specifically, locking collar 14 has a hollow annular body 25 with a passage 27 formed therethrough and opposing distal and proximal openings 30, 32 formed at either end of passage 27. The inner surface of passage 27 has internal threads 26 formed thereabout which are adapted for engagement with union 20 and terminate at an internal shoulder 28 adjacent proximal opening 30. In addition, a gripping surface 24 is provided around the outer surface of body 25 for gripping by the user's hand when rotating locking collar 14 into engagement with union 20 as shall be explained in greater detail below.

Figure 3:
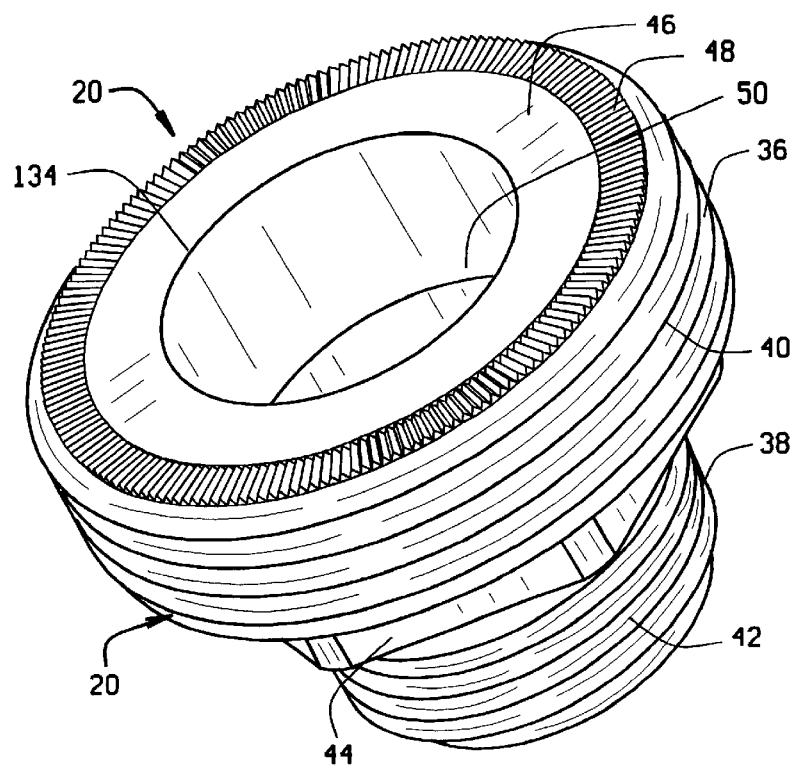
FIG. 3 is a perspective view of a preferred embodiment of a union according to the present invention.
Figure 4:
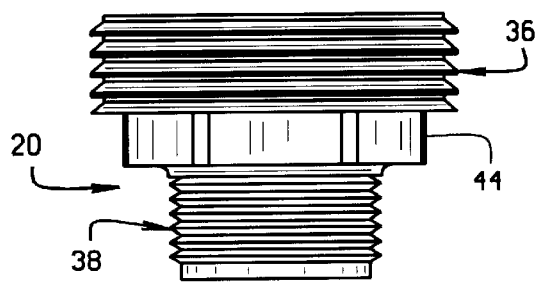
FIG. 4 is a side view of the preferred embodiment of the union according to the present invention.
Figure 5:
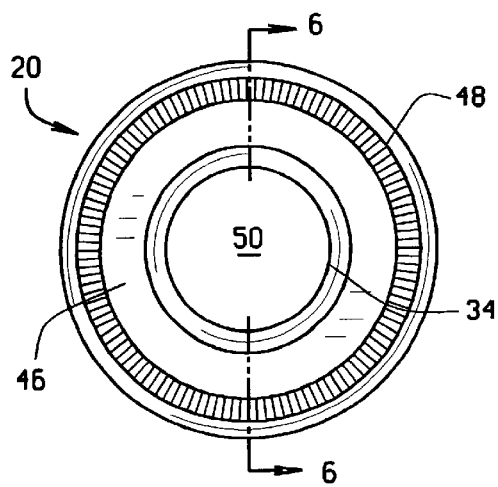
FIG. 5 is a top plan view of the preferred embodiment of the union according to the present invention.
Figure 6:
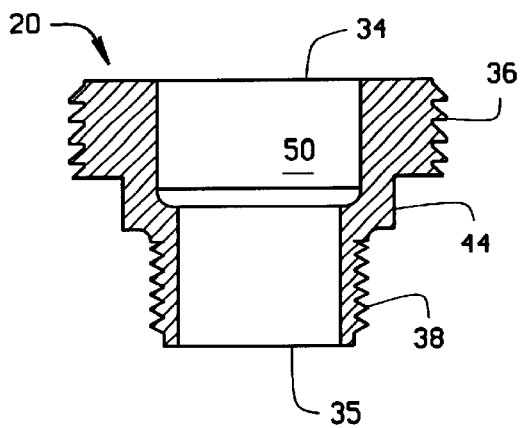
FIG. 6 is a cross-sectional view of the preferred embodiment of the union shown in FIG. 5 taken along line 6—6 according to the present invention.
Figure 7:
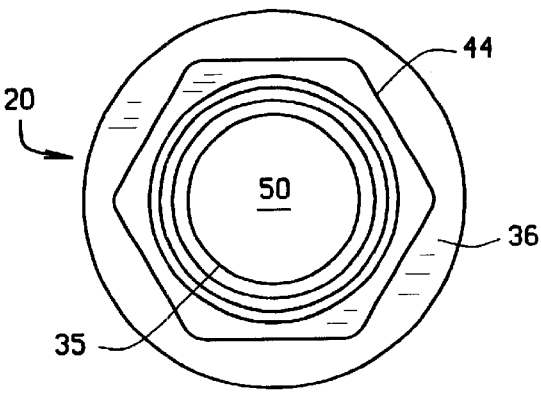
FIG. 7 is a bottom plan view of the preferred embodiment of the union according to the present invention.
Figure 8:
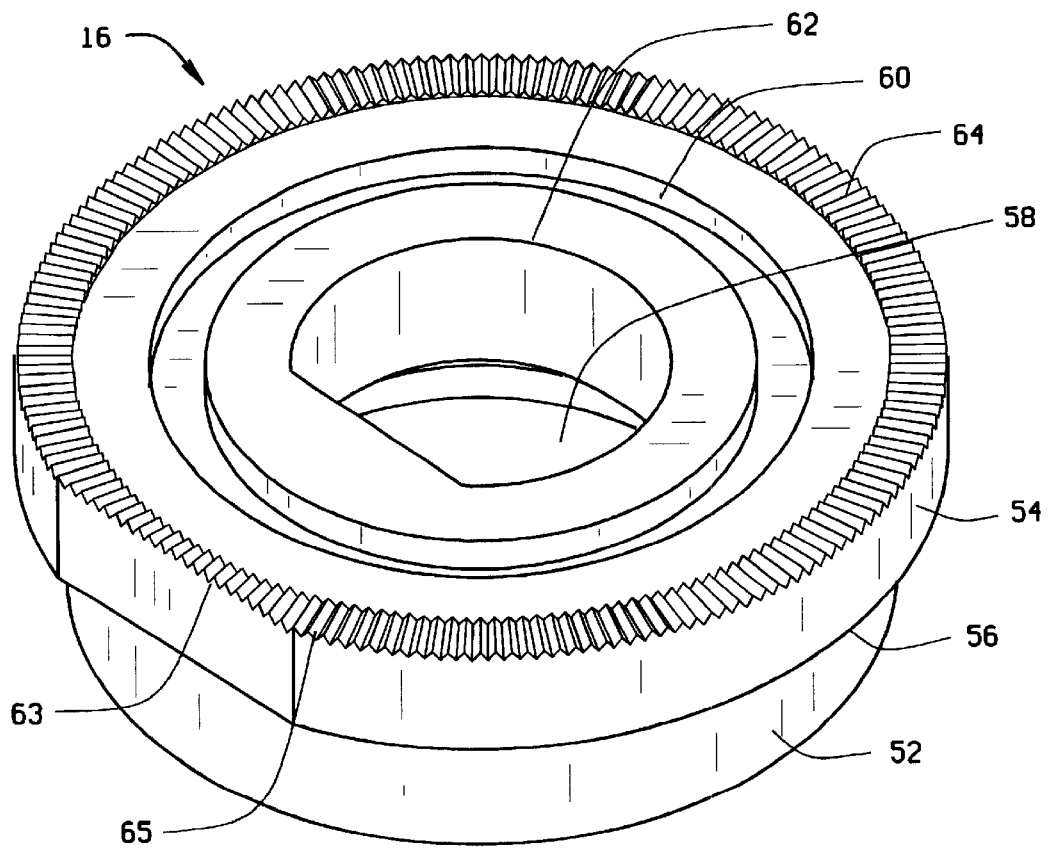
FIG. 8 is a perspective view of a union adapter according to the present invention.

As shown in FIGS. 3, 4 and 6, union 20 comprises annular shaped top and bottom threaded portions 36, 38 having respective external threads 40, 42 formed thereabout and a passageway 50 extending axially through union 20 for communication with the opening of T-fitting 22. Union 20 further includes a hexagonal-shaped shoulder 44 (FIG. 7) formed between top and bottom portions 36, 38 for abutting the lip (not shown) of the T-fitting 22 when coupling the union 20 thereto. Finally, as shown in FIG. 5, union 20 includes a top section 46 with radial teeth 48 having a serrated profile which are formed adjacent the outer circumference of section 46 for preventing rotation of housing 21 after installation to T-fitting 22 as shall be explained in greater detail below.

Figure 9:
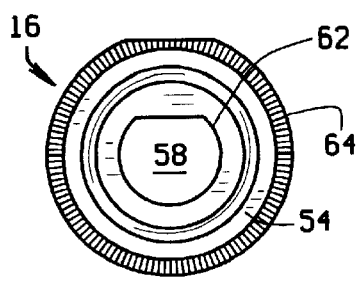
FIG. 9 is a top plan view of the union adapter according to the present invention.
Figure 10:
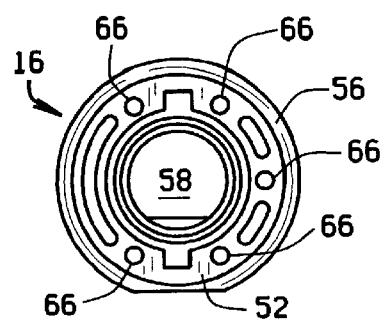
FIG. 10 is a bottom plan view of the union adapter according to the present invention.
Figure 11:
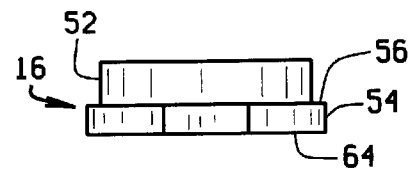
FIG. 11 is a side view of the union adapter according to the present invention.
Figure 12:
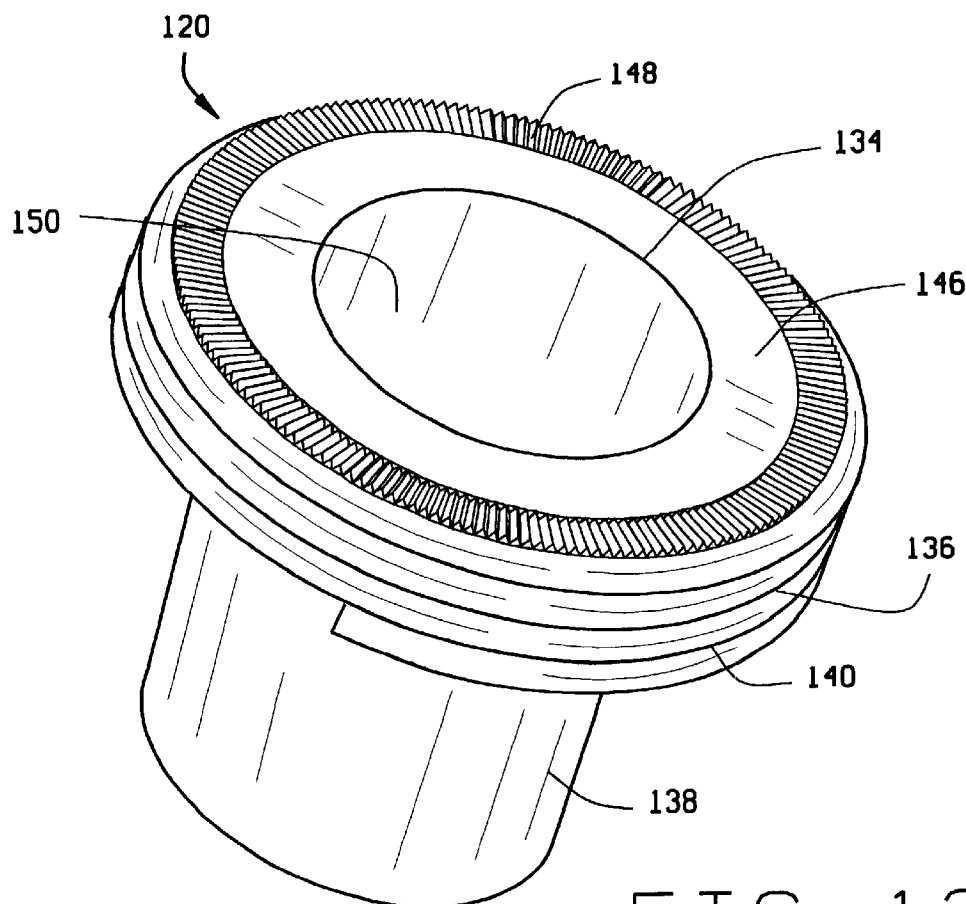
FIG. 12 is a perspective view of an alternative embodiment of the union according to the present invention.
Figure 13:
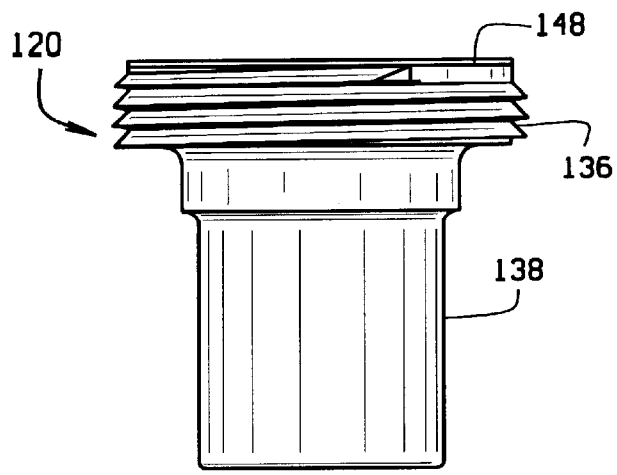
FIG. 13 is a side view of the alternative embodiment of the union according to the present invention.
Figure 14:
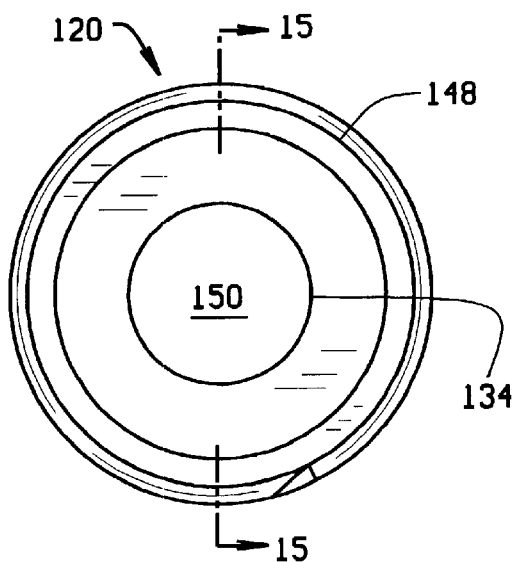
FIG. 14 is a top plan view of the alternative embodiment of the union according to the present invention.
Figure 15:
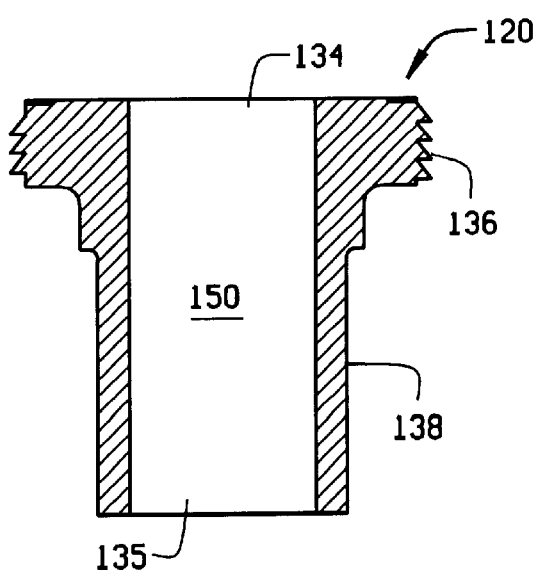
FIG. 15 is a cross-sectional view of the alternative embodiment of the union shown in FIG. 14 taken along line 15—15 according to the present invention.

Referring to FIGS. 8–11, union adapter 16 in conjunction with union 20 provides a means for preventing rotation of detection device 12 once device 12 is installed to T-fitting 22. Union adapter 16 has a generally annular shaped configuration and comprises upper and lower portions 52, 54 with a shoulder 56 formed therebetween. A passageway 58 extends axially through the body of union adapter 16 for providing a pathway that communicates with fluid conduit 23. As illustrated in FIG. 9, the face of lower portion 54 includes radial teeth 64 which have a serrated profile formed adjacent the outer circumference of portion 54 as well as an annular groove 60 formed between radial teeth 64 and passageway 58. To provide a fluid tight seal between union adapter 16 and union 20, annular groove 60 is adapted to receive an o-ring 18 (FIG. 2) therein for providing a fluid tight seal when union adapter 16 is engaged with union 20 during assembly and operation of anti-rotation arrangement 10. Finally, upper portion 52 includes a plurality of holes 66 for receipt of screws (not shown) or other suitable attachment means for securing union adapter 16 to housing 21.

To assemble and operate anti-rotation arrangement 10, lower portion 54 of union adapter 16 is first inserted through distal opening 32 of locking collar 14 until portion 54 abuts internal shoulder 28 of collar 14. Once properly seated inside locking collar 14, the user orients union adapter 16 such that holes 66 are properly aligned with apertures (not shown) formed in housing of detection device 12. Screws or other suitable securing means, such as bolts and the like, are then inserted into each aligned hole 66 and aperture until union adapter 16 is securely engaged with housing 21. In this engagement, locking collar 14 freely rotates between union adapter 16 and detection device 12. Once locking collar 14 is properly engaged, bottom threaded portion 38 of union 20 is threaded into the opening (not shown) of T-fitting 22 by rotating union 20 until shoulder 44 securely abuts the opening as illustrated in FIG. 1. The user then takes detection device 12 and engages the external threads 40 of union 20 to the internal threads 26 of locking collar 14 by rotating collar 14 in a counter-clockwise direction until both the union 20 and collar 14 are securely engaged to one another.

The use of locking collar 14 precludes rotation of the entire housing 21 in order to secure the detection device 12 to the T-fitting 22, thus the present invention may be installed in relatively small spaces. As union 20 becomes fully engaged with locking collar 14, radial teeth 48 of union 20 will interlock and mate with the radial teeth 64 of union adapter 16 such that rotation of housing 21 of detection device 12 relative to T-fitting 22 is prevented due to the interaction between the radial teeth 48 and 64 after installation. To uncouple detection device 12 from T-fitting 22, the user simply rotates locking collar 14 in a clockwise direction until union 20 fully disengages from collar 14. Although the preferred embodiment shows the locking collar 14 being rotated in a counter-clockwise direction for engagement and a clockwise direction for disengagement, the present invention contemplates that locking collar 14 can also be rotated in a clockwise direction for engagement and a counterclockwise direction for disengagement.

In an alternative embodiment of the present invention, shown in FIGS. 12–15, all components of the anti-rotation arrangement 10 remain the same except the union. In this alternative embodiment, union 120 comprises a top threaded portion 136 having external threads 140 formed thereabout for engaging internal threads of locking collar 14 and a bottom smooth portion 138 having a smooth tubular surface that extends axially from portion 136. As in union 20 of the preferred embodiment, union 120 has a hexagonal-shaped shoulder 144 formed between top threaded portion 136 and bottom smooth portion 138 for abutting the opening of the T-fitting 22 when engaging union 120 thereto with radial teeth 148 formed adjacent the outer circumference of top portion 146. Finally, a passageway 150 extends axially through union 120 for communication with fluid conduit 23 when union 120 is attached to the T-fitting. A unique feature of the alternative embodiment is that the smooth outer surface of lower smooth portion 138 is adapted for engagement with T-fittings (not shown) which do not have internal threads as found in the preferred embodiment, but rather a generally smooth inner surface. As such, the user of alternative embodiment invention may apply any suitable adhesive to the bottom smooth portion 138 prior to inserting portion 138 into the T-fitting which will provide a fluid tight bond between union 120 and the T-fitting.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. An anti-rotation arrangement for preventing rotation of a device comprising:
   an adapter having an upper portion and a lower portion, said lower portion including teeth formed thereabout, said upper portion being attachable to the device;
   a locking collar freely rotatable between said adapter and the device, said locking collar including a passage formed therethrough having a proximal opening and a distal opening, said upper portion of said adapter including a plurality of holes for receipt of a means of attachment to secure said adapter to the device through said proximal opening of said locking collar;
   a union having top and bottom portions, said top portion including teeth formed thereabout and said bottom portion being attachable to the fluid conduit, said top portion being attachable to said adapter through said locking collar such that said teeth of said adapter mate with said teeth of said union in such a manner that rotation of the device relative to the fluid conduit is prevented.

2. The anti-rotation arrangement according to claim 1, wherein said teeth of said adapter and said teeth of said union extend radially inward adjacent an outer circumference of said adapter and said union, respectively.

3. The anti-rotation arrangement according to claim 1, wherein said passage of said locking collar includes internal threads which extend from said distal opening and terminate at said inner shoulder.

4. The anti-rotation arrangement according to claim 3, wherein said top portion of said union includes external threads.

5. The anti-rotation arrangement according to claim 4, wherein said locking collar is engaged to said top portion of said union by rotating said locking collar in one direction, whereby said internal threads engage with said external threads when said locking collar is rotated in said one direction.

6. The anti-rotation arrangement according to claim 5, wherein said locking collar is disengaged to said top portion of said union by rotating said locking collar in a direction opposite to said one direction, whereby said internal threads disengage from said external threads when said locking collar is rotated in said opposite direction.

7. The anti-rotation arrangement according to claim 1, wherein said adapter further includes a passage formed therethrough for communication between the device and the fluid conduit.

8. The anti-rotation arrangement according to claim 1, wherein said adapter further includes a groove formed between said passage and said teeth of said adapter for receipt of a sealing means for maintaining a fluid tight seal between said adapter and said union.

9. The anti-rotation arrangement according to claim 8, wherein said sealing means is an o-ring.

10. The anti-rotation arrangement according to claim 1, wherein said locking collar further includes a gripping surface for gripping said locking collar by a user.

11. The anti-rotation arrangement according to claim 1, wherein rotation of said locking collar does not cause rotation of the device.

12. An anti-rotation arrangement for preventing rotation of a device comprising:
    an adapter having an upper portion and a lower portion, said lower portion including teeth formed thereabout, said upper portion being attachable to the device;
    a locking collar freely rotatable between said adapter and the device, said locking collar including a passage formed therethrough having an inner shoulder, said locking collar further including proximal and distal openings formed at opposite ends of said passage;
    a union having top and bottom portions, said top portion including teeth formed thereabout and said bottom portion being attachable to the fluid conduit, said top portion being attachable to said adapter through said locking collar such that said teeth of said adapter mate with said teeth of said union in such a manner that rotation of the device relative to the fluid conduit is prevented,
    wherein said adapter is seated against said inner shoulder of said passage and secured to the device through said proximal opening of said locking collar.

13. In combination, an adapter in an anti-rotation arrangement with a device attached to a fitting of a fluid conduit comprising:

an adapter including an upper portion and a lower portion with a passage formed therethrough for communication with the fluid conduit, said passage being oriented in a perpendicular relationship with said fluid conduit and adapted to receive a portion of the device therethrough, said lower portion having teeth extending inwardly from around an outer circumference of said adapter, said upper portion being attachable to the device, a locking collar having a passage formed therethrough with distal and proximal openings; said passage including a inner shoulder adapted for seating said upper section of said adapter therein, said locking collar being freely rotatable between said adapter and the device, and a union having top and bottom portions and a passage in communication with said passage of said adapter and the fluid conduit, said top portion including teeth extending inwardly from around an outer circumference of said union, said bottom portion being attachable to the fitting of the fluid conduit, said top portion being attachable to said lower portion such that said teeth of said adapter mate with said teeth of said union so that rotation of the device relative to the fluid conduit is prevented.

\* \* \* \* \*